United States Patent
Nakayoshi et al.

(10) Patent No.: US 10,038,801 B2
(45) Date of Patent: Jul. 31, 2018

(54) IMAGE READING APPARATUS AND IMAGE FORMING APPARATUS

(71) Applicant: CANON KABUSHIKI KAISHA, Tokyo (JP)

(72) Inventors: Asahiro Nakayoshi, Matsudo (JP); Hidenori Sunada, Abiko (JP); Hiromasa Maenishi, Matsudo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/211,926

(22) Filed: Jul. 15, 2016

(65) Prior Publication Data

US 2017/0041478 A1    Feb. 9, 2017

(30) Foreign Application Priority Data

Aug. 4, 2015    (JP) ................. 2015-154097

(51) Int. Cl.
    *H04N 1/00*    (2006.01)
(52) U.S. Cl.
    CPC ..... *H04N 1/00801* (2013.01); *H04N 1/00713* (2013.01); *H04N 1/00726* (2013.01); *H04N 1/00745* (2013.01); *H04N 1/00771* (2013.01); *H04N 1/00777* (2013.01); *H04N 2201/0081* (2013.01); *H04N 2201/0091* (2013.01)
(58) Field of Classification Search
    CPC ................................................ H04N 1/00801
    USPC ...................................................... 358/1.14
    See application file for complete search history.

(56) References Cited

U.S. PATENT DOCUMENTS

| | | | | |
|---|---|---|---|---|
| 9,185,240 | B2* | 11/2015 | Kojima | H04N 1/00013 |
| 2007/0035760 | A1* | 2/2007 | Hachiro | H04N 1/00681 |
| | | | | 358/1.13 |
| 2013/0242355 | A1* | 9/2013 | Morita | H04N 1/00734 |
| | | | | 358/449 |
| 2013/0292898 | A1* | 11/2013 | Miyamoto | B65H 9/20 |
| | | | | 271/227 |
| 2014/0307278 | A1* | 10/2014 | Kinoda | G06K 15/16 |
| | | | | 358/1.12 |

FOREIGN PATENT DOCUMENTS

| | | |
|---|---|---|
| JP | 2000-155444 | 6/2000 |
| JP | 2000-310820 | 11/2000 |
| JP | 3313098 | 8/2002 |

\* cited by examiner

*Primary Examiner* — Jacky Zheng
(74) *Attorney, Agent, or Firm* — Fitzpatrick, Cella, Harper & Scinto

(57) ABSTRACT

An image reading apparatus includes: a first size-detecting portion which detects a size of an original disposed on a disposing portion; a conveying portion which conveys the original disposed on the disposing portion to a reading portion, a second size-detecting portion which detects the size of the original to be conveyed by the conveying portion; a controller which calculates an overlap region between a reading region and an original region, with the reading region determined based on a reading size obtained by a obtain portion and the detection of the first size-detecting portion, and the original region determined by the second size-detecting portion; and a notifying portion which makes a predetermined notification based on the information that has been calculated.

11 Claims, 17 Drawing Sheets

FIG. 7

| ORIGINAL WIDTH SECTION | ORIGINAL-WIDTH DETECTING SENSOR 14 x [mm] | ORIGINAL-LENGTH DETECTING SENSORS (SENSOR 15/SENSOR 16) | | | |
|---|---|---|---|---|---|
| | | ON / ON | OFF / ON | ON / OFF | OFF / OFF |
| 1 | x ≦ 144 | STMT - R | STMT - R | STMT - R | STMT - R |
| 2 | 144 < x ≦ 165 | A5 - R | A5 - R | A5 - R | A5 - R |
| 3 | 165 < x ≦ 196 | B5 - R | B5 - R | B5 - R | B6 |
| 4 | 196 < x ≦ 214 | A4 - R | A4 - R | A4 - R | A5 |
| 5 | 214 < x ≦ 236 | LGL - R | LGL - R | LTR - R | STMT |
| 6 | 236 < x ≦ 264 | B4 - R | B4 - R | B4 - R | B5 |
| 7 | 264 < x ≦ 288 | LDR - R | LDR - R | LDR - R | LTR |
| 8 | 288 < x | A3 - R | A3 - R | A3 - R | A4 |

FIG. 11A
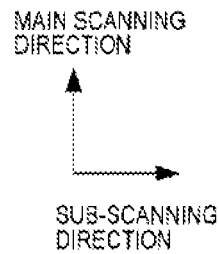
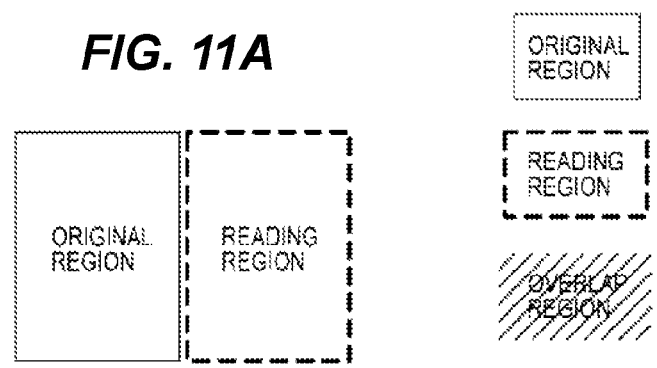
FIG. 11B    FIG. 11C
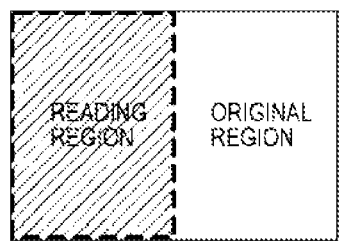
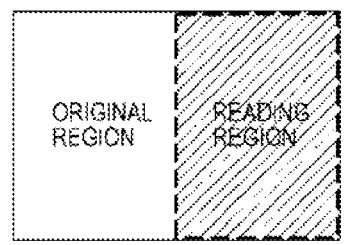
FIG. 11D    FIG. 11E
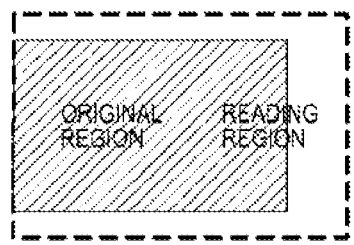
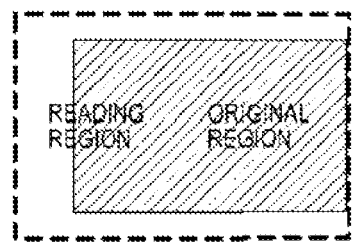
FIG. 11F
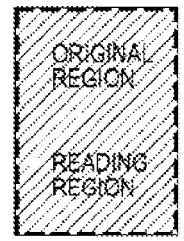

IMAGE READING APPARATUS AND IMAGE FORMING APPARATUS

BACKGROUND OF THE INVENTION

Field of the Invention

The present invention relates to an image reading apparatus capable of reading an image described in an original by specifying a size, and an image forming apparatus including the image reading apparatus.

Description of the Related Art

In an image reading apparatus, such as a copying machine, the following scanning action is typically performed. The so-called auto original conveying portion continuously conveys originals to be read one by one. After that, images are optically read from these originals and then image data is acquired.

When an original fed by an automatic document feeder portion is read, a size of the original is sometimes detected on a tray on which a sheaf of originals is disposed, and then an image region with the size that has been detected is read. Using the size of the original detected on the tray, can progress processing, such as determination of a sheet size to be fed from a printer. Accordingly, productivity of the number of sheets to be read per hour or a first copy output time (FCOT) during which a printing action starts and a first sheet is discharged, can be improved.

However, the size of the original detected on the tray and a size of the original that has been conveyed and read are sometimes different from each other. For example, this is a case where a plurality of different original sizes is mixed and disposed (consolidation). In this case, when a user specifies an image reading size, a case where a reading region of the original with respect to the size specified by the user is different from a reading region of the original determined with an actual, correct original size, sometimes occurs.

When reading continues in this state, there is a risk that the correct reading region is not read and a reading image of the original becomes partially lost with respect to the initial original. In a worst-case, there is a risk that the reading region does not completely correspond to the original region so that the reading region becomes a blank paper.

The following configuration has been proposed with respect to this type of abnormality of the reading image. An abnormality determining unit determines an abnormal value. In a case where abnormality is detected, a reading position is changed (refer to Japanese Patent No. 3313098).

In addition, the following configuration has been proposed. In order to reduce a possibility that a reading image becomes partially lost, the length of an original that has been being conveyed, in a conveying direction is measured. Then, an image size is switched and reading is performed (refer to Japanese Patent Laid-Open No. 2000-155444).

As described above, in a case where the user has specified the image reading size, the following state occurs. The reading region of the original with respect to the size specified by the user and the reading region of the original determined with the original size that has been actually conveyed, are different from each other. In this case, the configuration in which the abnormality determining unit changes the reading position in a case where abnormality is detected as in Japanese Patent No. 3313098 or the configuration in which the length of the original is measured in a conveying direction, the image size is switched, and the reading is performed as in Japanese Patent Laid-Open No. 2000-155444, cannot determine a sheet size fed from a printer. Therefore, there is a risk that productivity and a FCOT degrade. That is there is a problem that a deficiency of the image cannot be prevented with the productivity and the FCOT prevented from degrading.

Here, even in a case where the reading region specified by the user and the region of the original are different from each other, a deficiency of an image does not occurs in a case where a region larger than the actual original size is specified as an image reading size. In a case where the deficiency of an image does not occur, carelessly cancelling the reading of the original causes non-ease of use.

SUMMARY OF THE INVENTION

It is desirable to provide an image reading apparatus and an image forming apparatus that are capable of promptly notifying a user of an image deficiency of an original with productivity and a FCOT prevented from degrading, by cancelling reading if necessary even in a case where a specified reading region and an original region are different from each other.

An image reading apparatus according to the present inventions includes: An image reading apparatus comprising: a reading portion configured to read an image of a sheet; a disposing portion configured to be disposed the sheet thereon; a first size-detecting portion configured to detect a size of the sheet disposed on the disposing portion; a conveying portion configured to convey the sheet disposed on the disposing portion to the reading portion; a second size-detecting portion configured to detect the size of the sheet to be conveyed by the conveying portion; an obtain portion configured to obtain information on a reading size of the sheet to be read; a controller configured to calculates an overlap region between a reading region and a sheet region, the reading region determined based on the reading size obtain by the obtain portion and the detection of the first size-detecting portion, and the sheet region determined by the second size-detecting portion; and a notifying portion which makes a predetermined notification based on the overlap region that has been calculated.

According to an embodiment of the present invention, there can be provided an original reading apparatus and an image forming apparatus that automatically determine a deficiency of a reading image and give a notification to a user so that the user can perform a reset for re-reading an original without hesitation.

Further features of the present invention will become apparent from the following description of exemplary embodiments with reference to the attached drawings.

BRIEF DESCRIPTION OF THE DRAWINGS

FIG. 7 is an original-size-determination table for determining an original size based on a detection result of an original-size detecting sensor;

FIGS. 11A to 11F are views of an overlap area between the original region and the reading region in the conveying direction;

DESCRIPTION OF THE EMBODIMENTS

Figure 1:
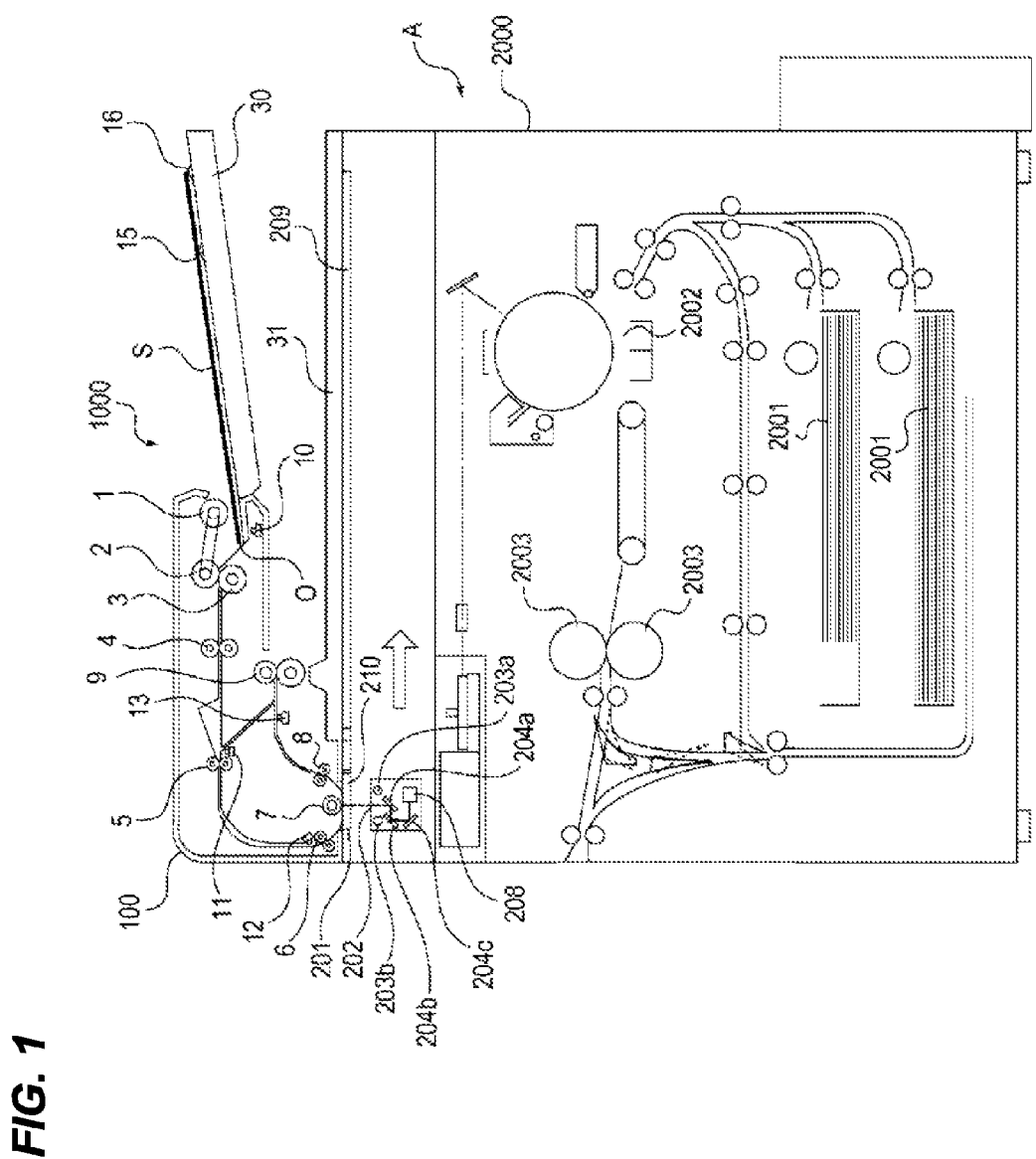
FIG. 1 is a sectional view of an image forming apparatus including an image reading apparatus according to an embodiment.

FIG. 1 is a sectional view of an image forming apparatus including an image reading apparatus according to the present embodiment. The image forming apparatus A according to the present embodiment is a copying machine including the image reading apparatus 1000 disposed at an upper portion of an apparatus main body and an image storing apparatus 2000 disposed at an lower portion thereof. That is, an original set in the image reading apparatus 1000 is read. Based on the reading information, a pair of conveying rollers conveys a sheet from a cassette 2001 set at a lower portion of the apparatus main body to an image storing portion 2002 using an electrophotographic system. After that, a toner image is formed. The sheet is discharged to the outside of the apparatus main body after toner fixation at a fixing portion 2003

The image reading apparatus 1000 according to the present embodiment includes an image reading portion 200 which reads an image of the original, and an automatic document feeder portion (hereinafter, referred to as an ADF) 100, furthermore, is coupled to a controller portion (not illustrated) in FIG. 1.

<Image Reading Portion>

The image reading portion 200 will be described with reference to FIG. 1. An optical scanner unit 202 scans an original sheet disposed on an original platen glass 209 in a sub-scanning direction illustrated with an arrow in FIG. 1 at a constant speed so that the image reading portion 200 reads image information stored in the original line by line (stationary reading). In addition, for an original on the ADF 100, an optical scanner unit 202 moves so as to be at a center position of a leading roller 7 in the ADF 100. Then, the original fed and conveyed by a method to be described later is optically read (scanning).

<ADF>

A configuration of the ADF 100 will be described together with operation with reference to FIG. 1. The ADF 100 illustrated in FIG. 1 includes an original tray 30 as a disposing portion in which a sheaf of originals S having at least one original sheet is piled and disposed, separating upper and lower rollers 2 and 3 which regulate an advance of the sheaf of originals S to the downstream side due to protrusion of the sheaf of originals S from the original tray 30 before conveying of the original starts, and a feeding roller 1. An original detecting sensor 10 is provided to the original tray 30, and can determine whether an original is present on the original tray 30.

A conveying portion conveys an original disposed on the original tray 30 to the image reading portion 200. Specifically, the feeding roller 1 falls on an original surface of the sheaf of originals S piled on the original tray 30 and rotates. Accordingly, an original on a top surface of the sheaf of originals is fed. The original that is one sheet on the top surface, fed by the feeding roller 1 is separated and conveyed by action of the separating upper roller 2 and the separating lower roller 3. This separation is achieved by a known separation technique.

The original separated by the separating upper roller 2 and the separating lower roller 3 is conveyed to a registration roller 5 by a drawing roller 4. Then, the original is pressed against the registration roller 5. Accordingly, the original is made to have a loop-shaped deflection. Thus, skew feeding is eliminated in the conveying of the original. A feeding passage is disposed on the downstream side of the registration roller 5. The original that has passed through the registration roller 5 is conveyed in a direction to a scanning glass 201 through the feeding passage.

The original sent to the feeding passage is conveyed to an image reading position by a reading upstream roller 6. When passing between the scanning glass 201 and the leading roller 7, a surface of the original is irradiated with LEDs 203a and 203b. An image reading sensor 208 reads a surface image of the original line by line with a reflected light bent by a plurality of mirrors 204a, 204b, and 204c. The original conveyed by a reading downstream roller 8 is conveyed to a discharge tray 31 that is a discharge portion, by a discharge roller 9 while passing through a discharge sensor 13 in a case where only the surface image of the original is read.

In a case where a back image of the original is also read, the surface image is read in the above manner. After a rear end of the original has passed through the discharge sensor 13, the original is made to stop before passing through the discharge roller 9. Rotating the discharge roller 9 reversely conveys the original to the registration roller 5. Conveyance is performed in a manner similar to the above conveyance so that the back of the original can be read. Furthermore, after reading of the back image has been completed, the original is made to stop before passing through the discharge roller 9 after the rear end of the original has passed through the discharge sensor 13. Then, the original is conveyed to the registration roller 5 again, and is conveyed to the discharge tray 31 without the image read. Accordingly, after all of the original images have been read, sequence of the originals to be discharged to the discharge tray 31 corresponds to sequence of the originals on the original tray 30 before the images have been read.

<Descriptions of Block Diagram>

Figure 2:
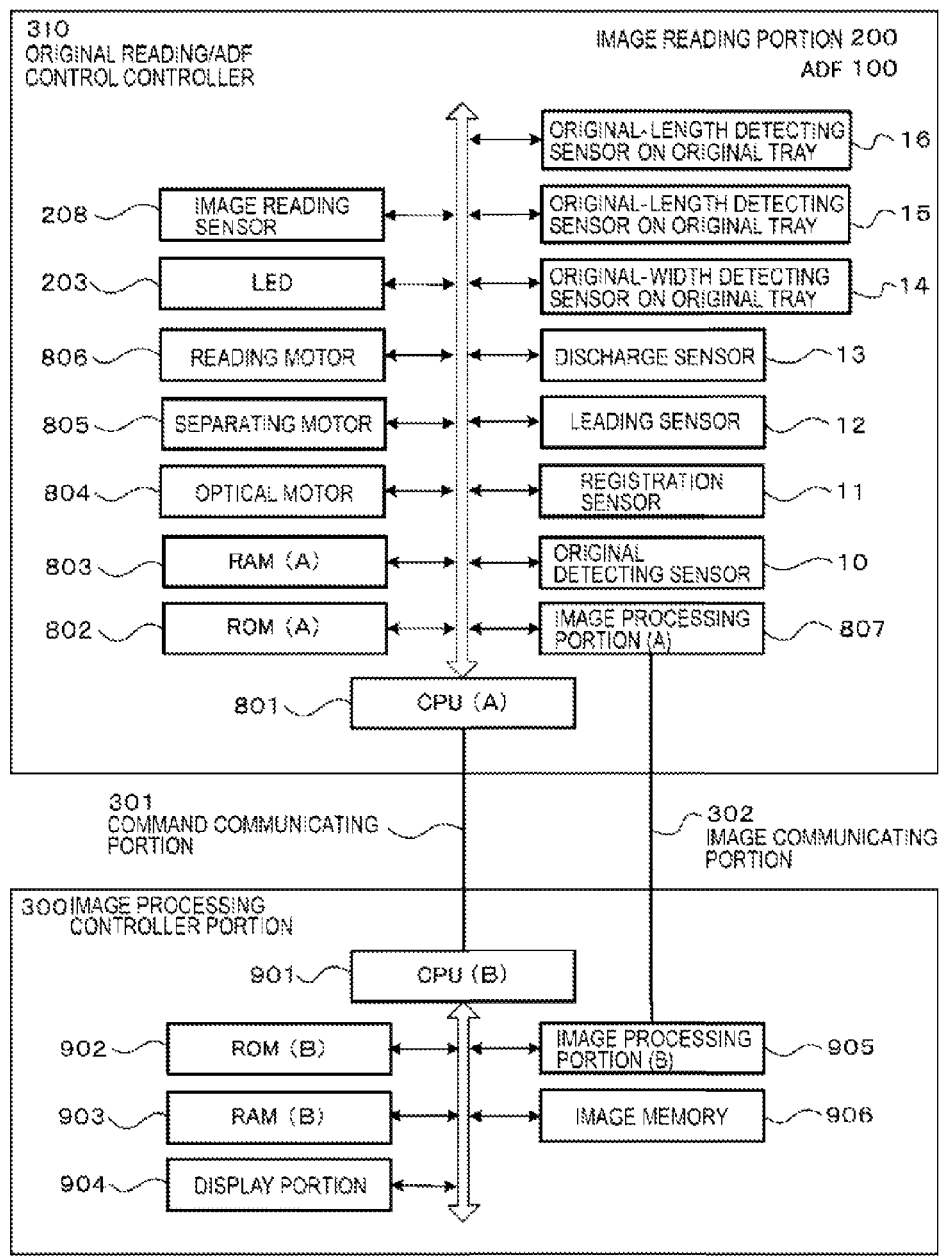
FIG. 2 is a block diagram of the image reading apparatus according to the embodiment.

FIG. 2 is a block diagram of an exemplary configuration of a controller of the image reading apparatus according to the present embodiment including the ADF 100. An original reading/ADF control controller 310 includes a CPU(A) 801, a ROM(A) 802, and a RAM(A) 803. The ROM(A) 802 stores a control program. The RAM(A) 803 stores input data and work data. The CPU(A) 801 executes the control program by following flow charts illustrated in FIGS. 5A, 5B, and 6.

A separating motor 805 and a reading motor 806 are coupled to the CPU(A) 801 in order to achieve an original conveying function. The separating motor 805 rotates and drives the feeding roller 1, the separating upper roller 2, the drawing roller 4, and the registration roller 5. The reading motor 806 drives the reading upstream roller 6, the leading roller 7, the reading downstream roller 8, and the discharge roller 9.

Furthermore, the CPU(A) 801 is coupled to the original detecting sensor 10, a registration sensor 11, a leading sensor 12, the discharge sensor 13, and an original-width detecting sensor 14. The original detecting sensor 10 detects an original piled on the original tray 30. The registration sensor 11 detects an original end portion on an auto original conveying passage. The original-width detecting sensor 14 detects the width of the original.

A conveying-portion size-detecting portion (second size-detecting portion) is provided in order to detect a size of the original to be conveyed by a conveying portion. The conveying-portion size-detecting portion according to the present embodiment has a motor which conveys the original, the motor including a pulse motor. The number of drive pulses is counted so that an original feeding length is detected. Specifically, an optical motor 804, the separating motor 805, and the reading motor 806 are pulse motors. The CPU(A) 801 counts and controls the number of drive pulses of each of the pulse motors so as to manage the number of revolutions of each of the motors. The CPU(A) 801 counts the number of drive pulses of the separating motor 805 during an interval during which the registration sensor 11 has been turned on and is turned off while the original has been being conveyed. Accordingly, the length of the original that has been being conveyed can be detected.

There is provided a disposing-portion size-detecting portion (first size-detecting portion) capable of detecting an original size even in a state where the original is disposed on the original tray 30. Thus, original-length detecting sensors 15 and 16 are provided at predetermined positions on the original tray 30. The original-length detecting sensors 15 and 16 can determine and detect the length of the original. For example, a distance between an original-leading-end position O and the original-length detecting sensor 15 is defined 220 [mm] and a distance between the original-leading-end position O and the original-length detecting sensor 16 is defined 330 [mm] in a state where the original has been disposed on the original tray 30. In this case, when the original-length detecting sensor 15 has been turned off and the original-length detecting sensor 16 has been turned off, the length of the original in a conveying direction (a sub-scanning direction) can be determined to be less than 220 [mm]. When the original-length detecting sensor 15 has been turned on and the original-length detecting sensor 16 has been off, the length of the original in the conveying direction (the sub-scanning direction) can be determined to be 220 [mm] or more but less than 330 [mm]. When the original-length detecting sensor 15 has been turned on and the original-length detecting sensor 16 has been turned on, the length of the original in the conveying direction (the sub-scanning direction) can be determined to be 330 [mm] or more.

The CPU(A) 801 determines the original size by combining information on the lengths of the original detected during the conveyance and on the original tray 30 by the above methods and information on the width of the original that can be detected by the original-width detecting sensor 14.

The LED 203 and the image reading sensor 208 are coupled to the CPU(A) 801 in order to achieve an image reading function. After an image processing portion 807 performs shading processing and various types of filter processing to image data read by the image reading sensor 208, the CPU(A) 801 transmits the image data to an image processing controller portion 300 through an image communicating portion 302. Furthermore, through a command communicating portion 301, the CPU(A) 801 notifies the image processing controller portion 300 of a vertical synchronizing signal as a reference of a leading end of original image data and a horizontal synchronizing signal as a reference of a pixel leading end of one line at timing at which the original is read.

The image processing controller portion 300 includes a CPU(B) 901, a ROM (B) 902, and a RAM (B) 903. The image processing controller portion 300 gives and receives data relating to image reading control through the command communicating portion 301 coupled to the CPU(A) 801. The image data to which the image processing portion 807 performed the processing, is transferred to an image processing portion 905 in the image processing controller portion 300 through the image communicating portion 302. After being subjected to predetermined image processing, such as determination in color, the image data is stored in an image memory 906. The image processing controller portion 300 includes an operation display portion 904 that is an input portion (obtain portion) into which a reading size of the original and the like are input. The CPU(B) 901 performs interface control with a user through the operation display portion 904. The operation display portion 904 displays predetermined information. Note that the CPU(B) 901 receives information input into the operation display portion 904 by the user, and processes the input information, such as a reading-job start.

<Original-Size Detection, Reading-Region Detection Control>

Next, notification control to the user by image-reading-region calculation to which the present embodiment has been applied, will be described with reference to the drawings. Note that an example of reading one side of an original will be described.

Figure 3:
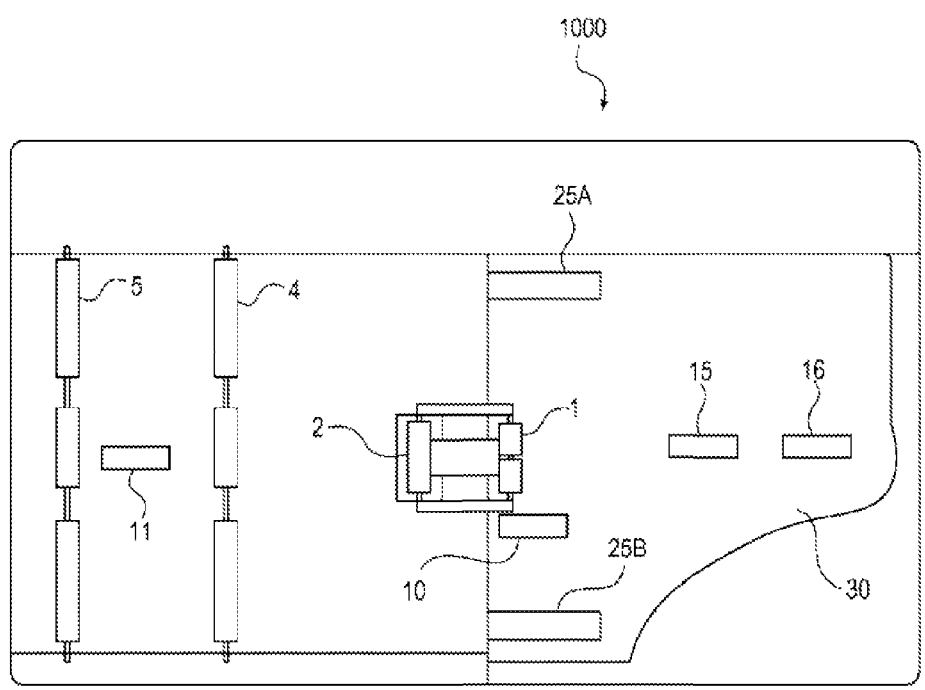
FIG. 3 is a top view of the image reading apparatus according to the embodiment.

First, a method of detecting a size of the original disposed on the original tray 30 in FIG. 1 will be described. FIG. 3 is a top view of the image reading apparatus 1000. The user disposes the original on the original tray 30, and sets original guide plates 25A and 25B so as to fit to the width of the original. The original-width detecting sensor 14 illustrated in FIG. 2 is configured to be able to detect the width between the original guide plates 25A and 25B. The CPU(A) 801 refers to a value of the original-width detecting sensor 14 so that the width of the original set on the original tray 30 can be detected.

Furthermore, the original-length detecting sensors 15 and 16 are configured to be turned on in a case where the original is present at positions of the respective sensors and configured to be turned off in a case where the original is not present at the positions. For example, a flag sensor which detects the original on the original tray 30 and an optical sensor which irradiates the original on the original tray 30 with light and detects a reflected light, can be selectively used for the original-length detecting sensors 15 and 16. For example, a configuration in which the optical sensor is used for the original-length detecting sensor 15 and the flag sensor is used for the original-length detecting sensor 16, can be provided. The CPU(A) 801 uses these values and determines a size, based on size-determination information previously stored in the ROM(A) 802.

When a copy is performed to the image storing apparatus 2000, a cassette feeding stage in a case of printing is specified into the operation display portion 904 and an output size to be printed is determined. Thus, the CPU(B) 901 can specify a reading region in response to the output size, to the CPU(A) 801. Using the size of the original detected on the original tray 30, can progress processing, such as the determination of a sheet feeding stage in the image storing apparatus 2000. Thus, productivity of the number of sheets to be read per hour and a FCOT can be improved.

Furthermore, when a file transferring function is performed, a transferring original size is specified through the operation display portion 904. Thus, the CPU(B) 901 can specify the reading region to the CPU(A) 801.

In a case where the reading region is specified through the operation display portion 904, there is a possibility that an original region and the reading region do not correspond to each other. The original region is a region in which the original is actually present. The reading region is a region in which the image reading portion 200 performs reading. FIGS. 4A to 4F are views of examples of an overlap region between a combination of the original region and the reading region. The original region is indicated with a region surrounded with a solid line. The reading region of the image reading apparatus 1000 is indicated with a broken line. For example, FIG. 4F illustrates a case where the original region is size A4 and the reading region is size A4. This is a normal case where the original region and the reading region correspond to each other.

Figure 4A:
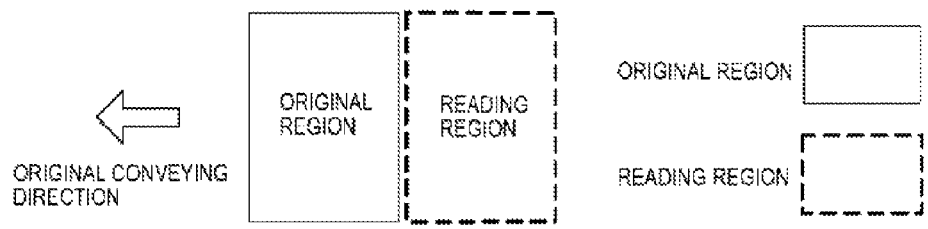
FIGS. 4A to 4F are views of examples of a region combination of an original region and a reading region.

FIG. 4A illustrates a case where the original region is size A4 and the reading region is an A4-sized region on the downstream side beyond the original region in the conveying direction. This occurs in a case where a detection result of a size of the original based on the original-length detecting sensors 15 and 16, and a size of the original that has been actually conveyed, are different from each other. For example, in a case where reading is performed with a rear end in the convey direction as a reference, this occurs when an A3-sized original and an A4-sized original are consolidated and disposed on the original tray 30, and also a user performs setting for reading size A4. The detailed descriptions will be given in a section of "Determination of overlap part". The above case where the reading region is outside the original region, is not appropriate for setting of the reading region. The embodiment of the present invention has been made in order to detect abnormality when reading of the outside of the original region is performed.

Note that the reason why the rear-end-reference reading is performed is because a region similar to that in platen reading is made to be read. Making a region in the platen reading and a region in the scanning of ADF 100 substantially the same enables to retain consistency of an image deliverable viewed by the user. This case may lead to reading of the outside of the original region.

Figure 4B:
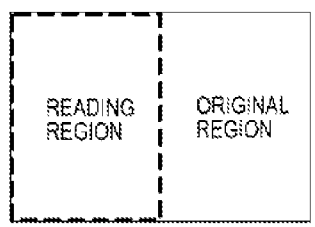

FIG. 4B illustrates a case where the original region is size A3-R and the reading region is an A4 region of the front half of the original region in the conveying direction (leading-end-reference reading). The leading-end-reference reading is reading that is performed from a leading end of an original to a predetermined region on the downstream side in the conveying direction with the leading end of the original as a reference. In FIG. 4B, an A3-R-sized original is disposed on the original tray 30 so that a reading surface faces the upper side. Reading setting is performed for conveying the original and for reading an A4-sized region of the front half of the original. The A4-sized region of the front half of the A3-R original in the conveying direction is read in a case where an image is read from the leading end of the original in the conveying direction.

In FIG. 4B, a reading magnification of 100 [%] is set. In a case where an input size of the original and an output size of a printer or a transferring file are made substantially the same, the rear half part of the A3-R-sized original is not read.

Figure 4C:
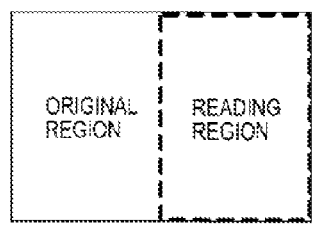

FIG. 4C illustrates a case where the original region is an A3-R-sized region, and the reading region is an A4-sized region of the rear half of the original region (rear-end-reference reading). The rear-end-reference reading is reading that is performed from a rear end of an original to a predetermined region on the upstream side in the conveying direction with the rear end of the original as a reference. In FIG. 4C, a reading magnification of 100 [%] is set. In a case where an input size of the original and an output size of a printer or a transferring file are made substantially the same for setting for reading an A4-sized region, the front half part of the A3-R original is not read.

Figure 4D:
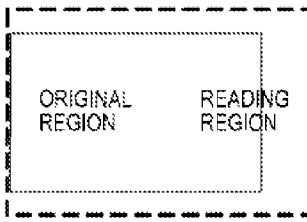
Figure 4E:
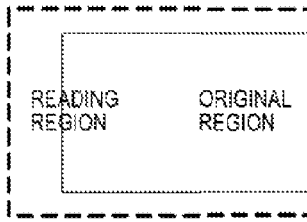
Figure 4F:

Furthermore, FIGS. 4D and 4E illustrates a case where an A3-R-sized reading region envelops an A4-R-sized original region. In this case, when reading is performed, an image in the original region is read without partially being lost.

<Reading Process>

Figure 5A:
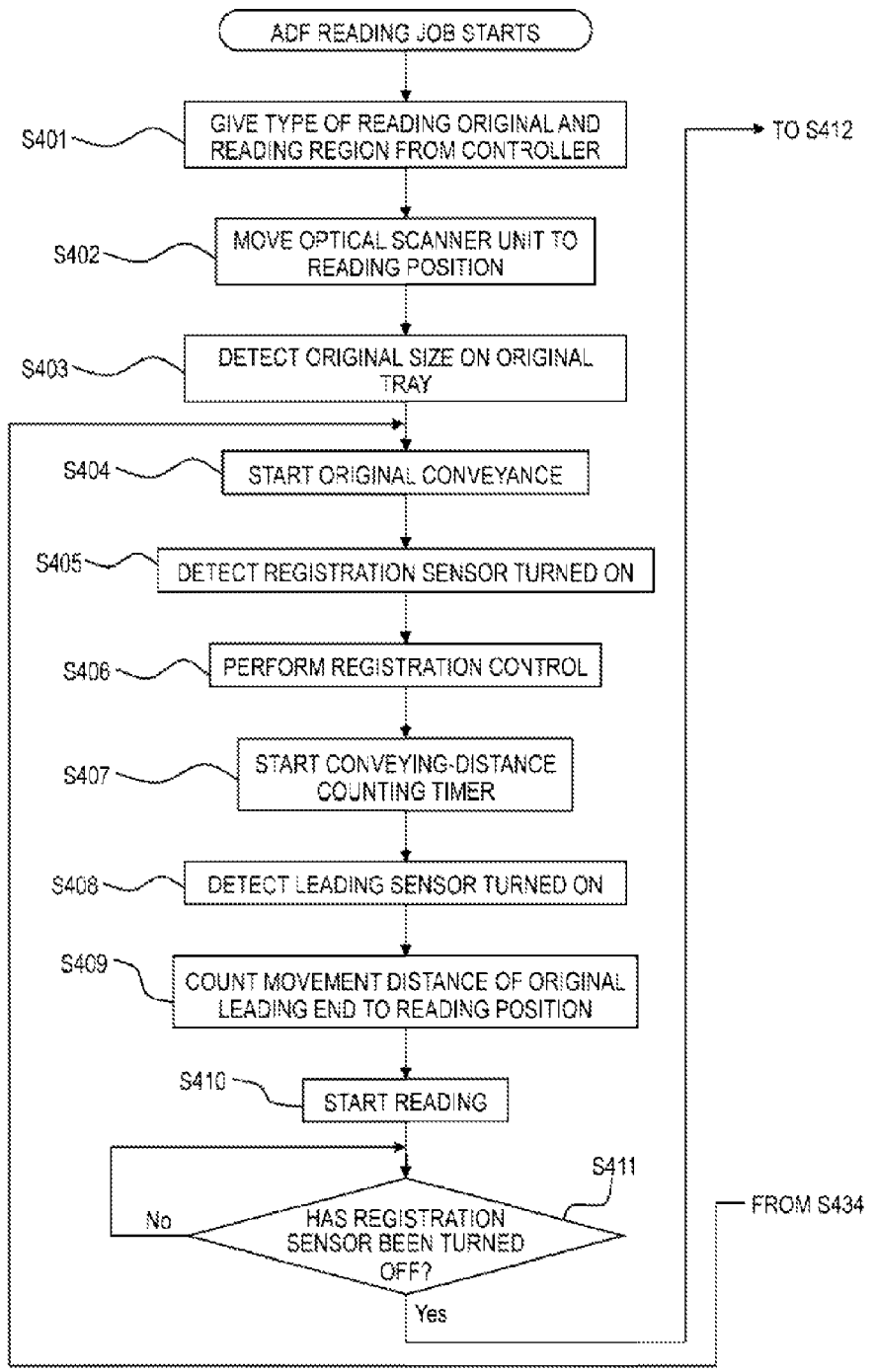
FIGS. 5A and 5B are a flow chart of detecting a size-abnormality original and giving a notification.
Figure 5B:
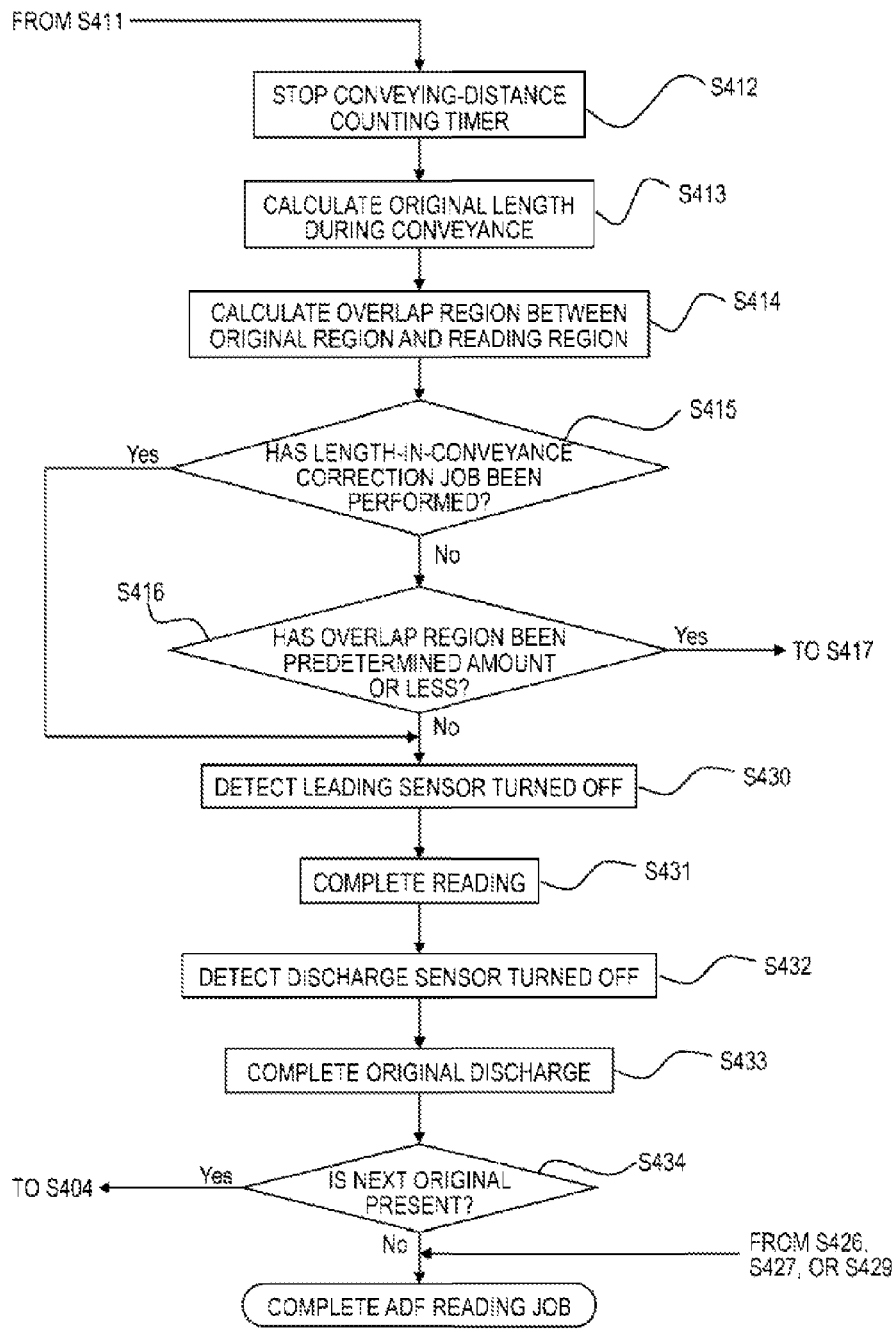
Figure 6:
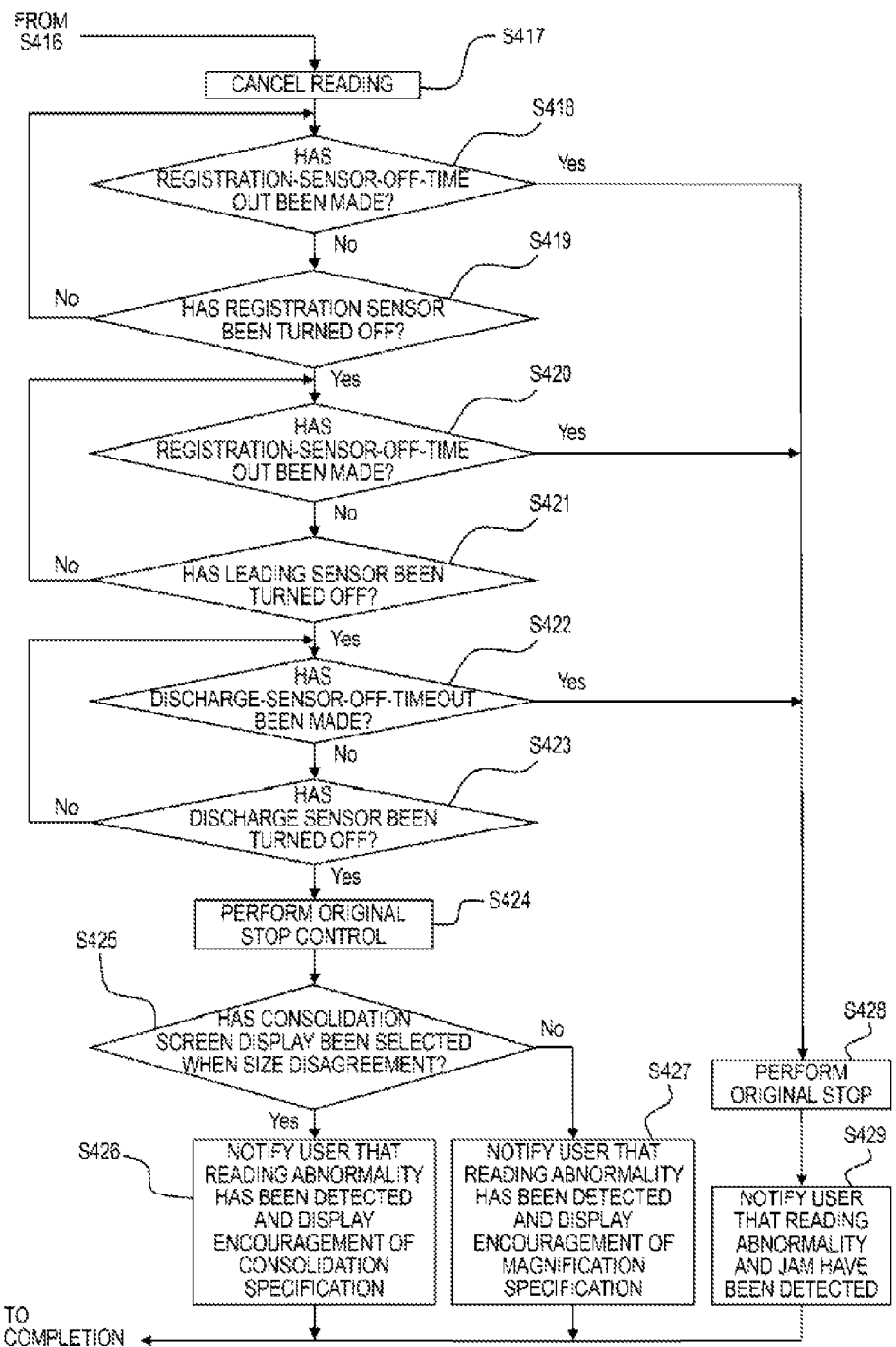
FIG. 6 is a flowchart of detecting a size-abnormality original and giving a notification.

As flow charts illustrated in FIGS. 5A, 5B, and 6, the above reading uses regions of the reading region and the original region and calculates an overlap region of the regions. The reading is performed in a case where the reading is possible. A notification is made to the user when the reading is inappropriate.

Specifically, the CPU(B) 901 notifies the CPU(A) 801 of a type of a reading original and a reading region when a reading job of the ADF 100 starts (S401).

The optical scanner unit 202 moves to a reading position (S402). The CPU(A) 801 controls the optical motor 804 to manage the number of drive pulses so that the optical scanner unit 202 moves under the scanning glass 201 near the leading roller 7. Note that, during a process of the movement to the reading position, the image processing portion 807 performs image processing, such as shading, with the LED 203 turned on.

Next, the CPU(A) 801 detects an original size on the original tray 30 (S403). The original size is determined based on a combination of detection results of the original-width detecting sensor 14, and the original-length detecting sensors 15 and 16.

FIG. 7 is a size-determination table when the CPU(A) 801 distinguishes the original size in response to the detection results of the original-width detecting sensor 14, and the original-length detecting sensors 15 and 16. Note that, in FIG. 7, for example, A4 indicates a size of A4 lateral feeding. A4-R indicates a size of A4 longitudinal feeding. Sections of the detection results of the original-width detecting sensor 14 are described in a column direction. The detection results of the original-length detecting sensors 15 and 16 are described in a row direction. For example, in a case the original-width detecting sensor 14 is an A/D-conversion sensor and a detecting result of 297 [mm] is detected, an original-width section is determined to be section 8.

In a case where the original-length detecting sensor 15 and the original-length detecting sensor 16 both detect OFF (no original present), the original size is determined to be size A4.

In a case where the original-width detecting sensor 14 detects 297 [mm] and at least one of the original-length detecting sensor 15 and the original-length detecting sensor 16 detects ON (original present), the original size is determined to be size A3.

Figure 8:
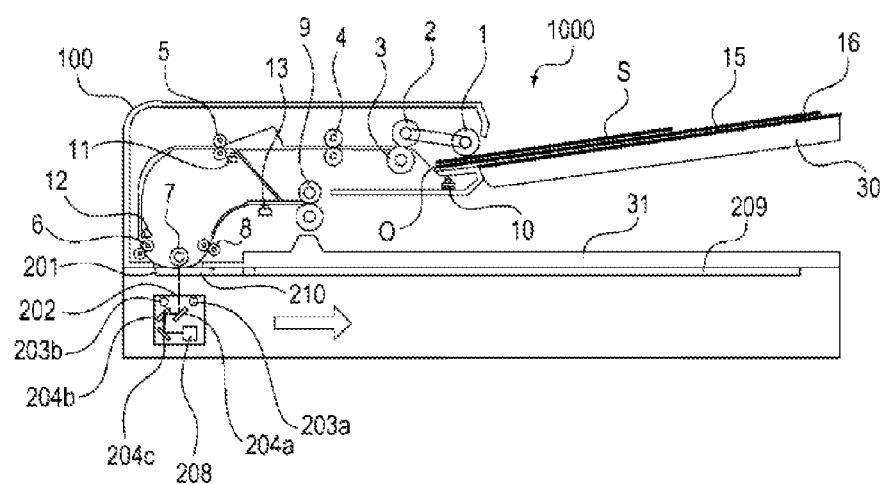
FIG. 8 is a sectional view of an A4-sized original and an A3-sized original disposed on an original tray.

Here, reading in a case where sheets having different sizes are consolidated on the original tray 30, will be described. FIG. 8 illustrates a condition in which an A4 original and an A3 original are consolidated on the original tray 30. In this case, a physical original size of a first original to be conveyed is size A4. An original size on the original tray 30, detected by the original-width detecting sensor 14 and the original-length detecting sensors 15 and 16, is determined to be size A3 with respect to the first original.

Next, the CPU(A) 801 starts conveyance of the original (S404). The conveyance of the original is achieved by driving the separating motor 805, falling the feeding roller 1 on an original surface, and rotating the separating upper roller 2 and the drawing roller 4.

When detecting that the registration sensor 11 has been turned on (S405), the CPU(A) 801 performs registration control (S406). The registration control is achieved by a known technique that forms a loop to an original in a registration loop space.

Next, the CPU(A) 801 starts a conveying-distance counting timer (S407). An original conveying-distance is counted at a position of the registration sensor 11. The conveying-distance count is measured until the registration sensor 11 is turned off (S411). Thus, the length of the original in the conveying direction can be measured during the conveyance.

After that, the CPU(A) 801 detects that the leading sensor 12 has been turned on when a leading end of the original has reached the leading sensor 12 (S408). Then, the CPU(A) 801 counts a distance between the leading sensor 12 turned on and a reading position, and detects timing at which the leading end of the original reaches the reading position (S409). That is, the number of drive pulses of the reading motor (pulse motor) 806 is counted during the conveyance. Then, an amount equivalent to the distance between the leading sensor 12 turned on and the reading position, is measured. The timing at which the leading end of the original reaches the reading position, is detected. Accordingly, an image can be read from the leading end of the original at timing at which the leading end of the original reaches the reading position.

Next, the CPU(A) 801 starts reading with the scanner unit 202 (S410). The CPU(A) 801 synchronizes image data read by the scanner unit 202 with a vertical synchronizing signal and a horizontal synchronizing signal. Then, the CPU(A) 801 transfers the image data line by line to the image processing controller portion 300 through the image communicating portion 302.

Next, the CPU(A) 801 stops the conveying-distance counting timer (S412) after a rear end of the original reaches the registration sensor 11 and the registration sensor 11 turned off is detected (S411).

Figure 9:
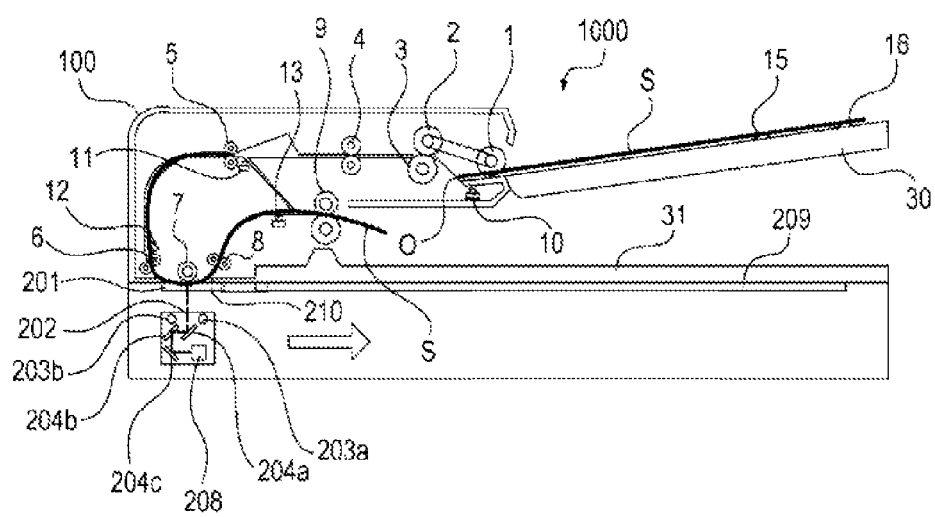
FIG. 9 is a sectional view of the A4-sized original that has been being conveyed.

FIG. 9 illustrates a state of the original when the rear end of the original is detected with the registration sensor 11 turned off. A time of the conveying-distance counting timer detected at S412 and a speed of conveyance are used so that the length of the original in the conveying direction is calculated (S413). Here, in a case where a stepping motor is used for the reading motor 806, counting the number of pulses that have been input, can directly measure the length of the original in the conveying direction.

(Determination of Overlap Region)

Next, an overlap region between the original region and the reading region is calculated (S414). Here, specific examples of calculating the overlap region between the original region and the reading region, includes a method of calculating the overlap in length in the conveying direction, and a method of calculating and using an area.

The method of calculating the overlap in length in the conveying direction uses the reading region specified through the operation display portion 904 at S401 and the length of the original in the conveying direction measured at S413.

The reading region specified through the operation display portion 904 at S401 is defined to be in a specification in which the leading end of the original in the conveying direction is at a reference position of zero [mm] and a region of from x [mm] to y [mm] is read.

FIG. 4A illustrates a case where the original region is an A4-sized region and the reading region is an A4-sized region in a range of from 210 [mm] to 420 [mm] in the conveying direction. This is a case where the A3-sized original is consolidated under the A4-sized original on the original tray 30 as illustrated in FIG. 8. In this case, when the A4-sized original is conveyed by the feeding roller 1, the A3-sized original is detected by the original-length detecting sensors 15 and 16. This may lead to a case where a specification in which the A4-sized reading region is read with a position of a rear end of the detected A3-sized original as a reference, is performed. In a case where the leading end of the original is at the reference position of zero [mm] in the conveying direction, setting for reading the range of from 210 [mm] to 420 [mm] is made. A specification in which the outside of the original region is read, is made.

As a method of detecting the reading of the above abnormal region, the length between a leading end of the original and an original-rear-end position that is the length of the original to be conveyed (hereinafter, referred to as a "original-rear-end position"), and the length between the leading end of the original and a reading-start position (hereinafter, simply referred to as a "reading-start position") are used. Then, it is detected to what extent the length of an image in the original region in the conveying direction has been read.

Specifically, "the reading-start position−the original-rear-end position" is calculated. The value is one indicator for determining whether the image has been appropriately read. Information on the overlap region calculated at S414 according to the present embodiment is a length acquired by subtracting the original-rear-end position with the leading end of the original as a reference from the reading-start position with the leading end of the original as the reference.

Similarly, the method of calculating and using an area uses information on a length in a main scanning direction perpendicular to the conveying direction in addition to that in the conveying direction of the original. Thus, an area of the overlap region between the original region and the reading region, can be calculated. The area can be used as information on the overlap region acquired at S414.

Here, as a method of detecting to what extent an image region has been read, calculation of the overlap region between the original region and the reading region will be described using FIGS. 10 and 11.

FIGS. 10A to 10F illustrate examples of calculating the overlap region relating to lengths of the original region and the reading region in the conveying direction. The physical length of the original in the conveying direction is indicated with a solid arrow. The sub-scanning length in the reading region is indicated with a broken arrow. The sub-scanning length in a region to be read in the original is indicated with a dotted arrow.

Figure 10A:
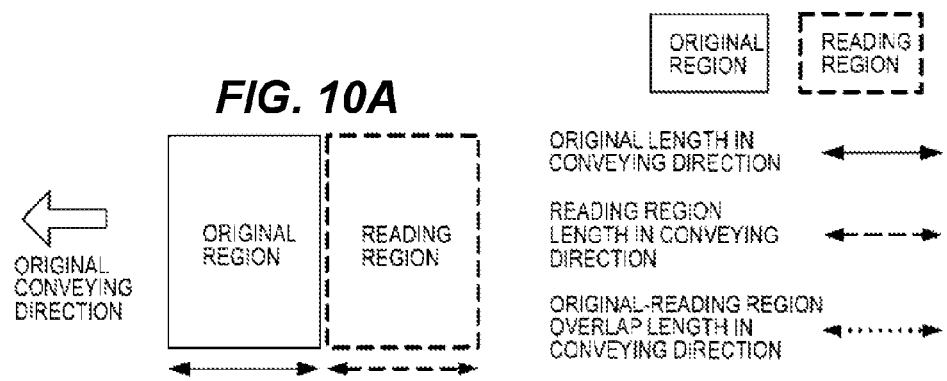
FIGS. 10A to 10F are views of an overlap length between an original region and a reading region in a conveying direction.

FIG. 10A illustrates a case where the original region is size A4, and the reading region is an A4-sized region on the downstream side of the original region in the conveying direction.

In this case, the image-reading-start position is 210 [mm]. The length of the original in the conveying direction measured with the original conveyed, is 210 [mm]+α [mm]. Note that α represents a conveyance-measuring error. This is approximately 2% of the actual length of the original. Thus, in a case where the length of the original is 210 [mm], the conveyance-measuring error α is approximately 4 [mm].

It is assumed that the conveyance-measuring error α is measured so as to be constantly a positive value in order to prevent the image from being lost. A margin β is provided in order to cancel the conveyance-measuring error α. β is, for example, 20 [mm].

The original-rear-end position measured with the original conveyed in consideration of the margin is defined to be "210 [mm] (the length of the origin in the conveying direction)+α [mm]−β [mm]".

Therefore, in FIG. 10A, "the reading-start position−the original-rear-end position" is "210−(210+α−β)", resulting in a positive value since the following expression is satisfied: β>α, as described above. In a case where being positive, the value indicates reading outside the original.

Figure 10B:
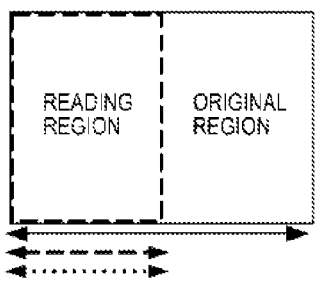

FIG. 10B illustrates a case where the original region is size A3, and the reading region is an A4-sized region of the front half of the original region in the conveying direction (leading-end-reference reading). In this case, the image-reading-start position is zero [mm] and a rear end of an original measured with the original conveyed is 420 [mm] (the length of the original in the conveying direction)+the conveyance-measuring error α [mm]. Note that, in this case, α is approximately 8 [mm]. Therefore, "the reading-start position−the original-rear-end position" is "0−(420+α−β)", resulting in a negative value.

Figure 10C:
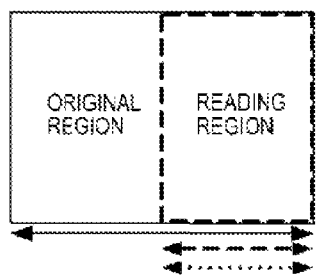

FIG. 10C is a case where the original region is size A3, and the reading region is an A4-sized region of the rear half of the original region in the conveying direction. The image-reading-start position is 210 [mm]. Therefore, "the reading-start position−the original-rear-end position" is "210−(420)+α−β", resulting in a negative value.

Figure 10D:
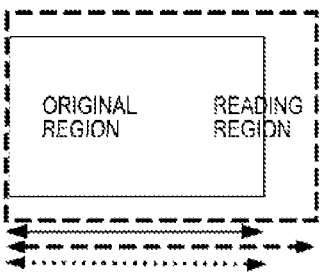
Figure 10E:
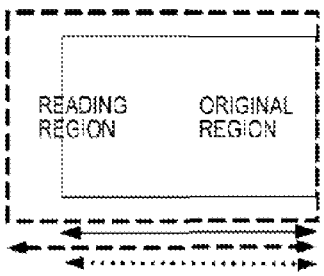
Figure 10F:
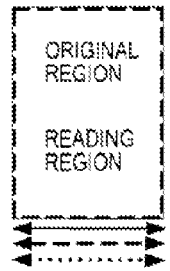

FIGS. 10D and 10E are cases where, for example, the original region is longitudinal size A4, the reading region is longitudinal size A3, and the reading region envelops the original region. In this case, "the reading-start position−the original-rear-end position" also results in a negative value.

FIGS. 10A to 10F illustrate the examples of calculating the overlap region relating to the lengths of the original region and the reading region in the conveying direction. The overlap region (overlap area) may be calculated based on the lengths of the original region and the reading region in the conveying direction and the lengths in an image scanning direction perpendicular to the conveying direction. Here, examples of calculating the overlap area will be described with reference to FIGS. 11A to 11E. Note that, relationship between the original region and the reading region in FIGS. 11A to 11E is substantially the same as that in FIGS. 10A to 10E.

In FIG. 11A, for example, the area of the original region is size A4, the area of the reading region is size A4, the length between a leading end of an original and the reading-start position is 210 [mm]. Accordingly, the reading region is outside the original region. There is no overlap area region indicated with slant lines. Therefore, a ratio of the area of the overlap region divided by the area of the original region is defined as a ratio of a region read in the original region (reading ratio). In this case, the reading ratio is zero.

In FIG. 11B, the area of the original region is size A3 and the area of the reading region is size A4. The length between a leading end of an original and the reading-start position is zero [mm]. Accordingly, the overlap area between the reading region and the original region is size A4, and the reading ration is 1/2 in this case. In FIG. 11C, the length between a leading end of an original and the reading-start position is 210 [mm]. The overlap area between the reading region and the original region is size A4 and the reading ratio is 1/2 as in FIG. 11B.

The length between a leading end of an original and the reading-start position in FIG. 11D is different from that in FIG. 11E. However, the areas of the original regions both are size A4, the areas of the reading regions are size A3, and the overlap area regions are size A4. Accordingly, the reading ratio of the overlap region area divided by the original area is one in both of the cases.

In FIG. 11F, the area of the original region is size A4, the area of the reading region is size A4, and the length between a leading end of an original and the reading-start position is zero [mm]. Accordingly, the overlap area is size A4, and the reading ratio is one. As described above, the reading ratio is used as information on the overlap region acquired at S414. For example, reading can be cancelled in a case where the reading ratio is zero.

Determination of whether the reading should continue, with the information on the overlap region acquired at S414, is made depending on whether the overlap region has been a predetermined amount or less at S416 after whether a length-in-conveyance correction job has been performed is determined at S415 in FIG. 5B.

The length-in-conveyance correction job at S415 is made, with the length measured while being conveyed, by a reading portion referred to as a long-version setting reading that secures a large amount of memory region and performs reading. Whether the length-in-conveyance correction job is selected can be previously set by the user before the reading starts. When the length-in-conveyance correction job is set, the length measured while being conveyed is used. Thus, size information acquired by using the original-length detecting sensors 15 and 16, is not used for image reading.

The long-version setting reading according to the present embodiment is performed in accordance with the flow charts in FIGS. 5A, 5B, and 6. The CPU(B) 901 secures an image memory for a corresponding maximum original size of 297 [mm]×630 [mm]. An image is extracted from a region in which the image has been read, with the length of the original measured while being conveyed at S413. Accordingly, the length can be corrected while being read even in a case where an original size has not been previously known when the conveyance starts.

Whether the overlap region has been the predetermined amount or less at S416 is determined when a value acquired from the length of the original region in the conveying direction, the length of the reading region in the conveying direction, the reading-start position from a leading end of an original, and the length of the overlap region acquired at S414, is a threshold value or less. Alternatively, the determination is made when a value acquired from the area of the original region, the area of the reading region, the reading-start position from the leading end of the original, and the area of the overlap region, is the threshold values or less.

The above threshold value is defined to be zero. In a case where there is completely no overlap, namely, in cases in FIGS. 4A, 10A, and 11A, even when reading is performed, the original cannot read. Thus, the reading can be cancelled.

Note that, when the lengths of the original region and the reading region in the conveying direction are used for calculation of the overlap region, a measurement error may occur in the length of the original measured with the original conveyed. Thus, the length of "the reading-start position–the original-rear-end position" is defined as information on the overlap region acquired at S414. For example, the threshold value can be set to be approximately 20 [mm] and used in consideration of the conveyance-measuring error in the conveying direction. Image reading can continue in the cases of FIGS. 4B and 4C.

Accordingly, in a case where originals with different sizes are consolidated on the original tray 30 and there is no consolidation specification from the user, even when the reading image does not become a blank paper, the reading can be made to continue.

Setting the above threshold value appropriately can flexibly set whether the reading is cancelled.

For example, in FIG. 4B, in order to cancel the reading in a case where only the A4-sized region is specified to be read in the A3-sized original region, an image reading ratio on the original is acquired and the threshold value to be determined at S416 is made to be ½ or more for information on the overlap region at S414.

Figure 12:
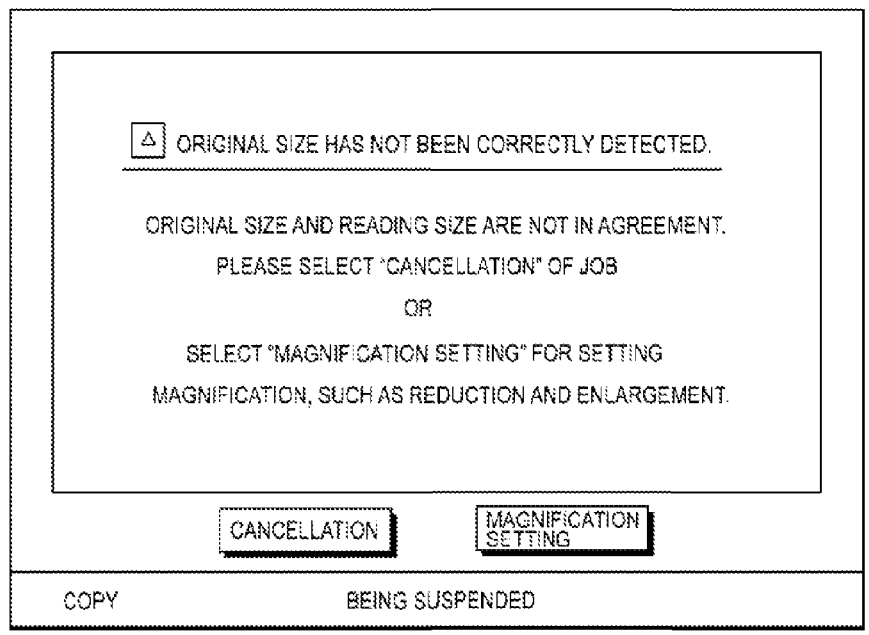
FIG. 12 is an operation-portion screen display when a notification is made that setting for cancellation or magnification is required.

As described above, the determination of cancellation can be made even in the cases of FIGS. 4B and 4C. In a case where only an A4-sized region is read in an A3-sized region, it can be thought that setting for magnification has been forgotten when an A3-sized original is expected to be read so as to be reduced to size A4. In this case, as illustrated in FIG. 12, a screen on which disagreement between the original size and the reading size, and a requirement for reading cancellation or magnification setting are displayed, can be displayed on the display portion at S427.

(A Case where Overlap Region Between Original Region and Reading Region is Predetermined Amount or Less)

The CPU(A) 801 cancels the reading when determining whether the overlap region has been a predetermined amount (threshold value) or less, at S416 (S417). The determination of whether the overlap region has been the predetermined amount (threshold value) or less can be made in a case where the value acquired at S414 is a positive value. In the case where the value acquired at S414 is a positive value, there is no overlap region between the original region and the reading region. The threshold value to be compared to the value acquired at S414 may vary in response to the original length. The CPU(B) 901 is notified of the cancellation of the reading through the command communicating portion 301. Making the notification of the cancellation before the reading is completed, can stop feeding before the printer feeds a printing sheet, in a case of a copying job. Accordingly, unnecessary printing can be prevented from being performed.

Figure 13:
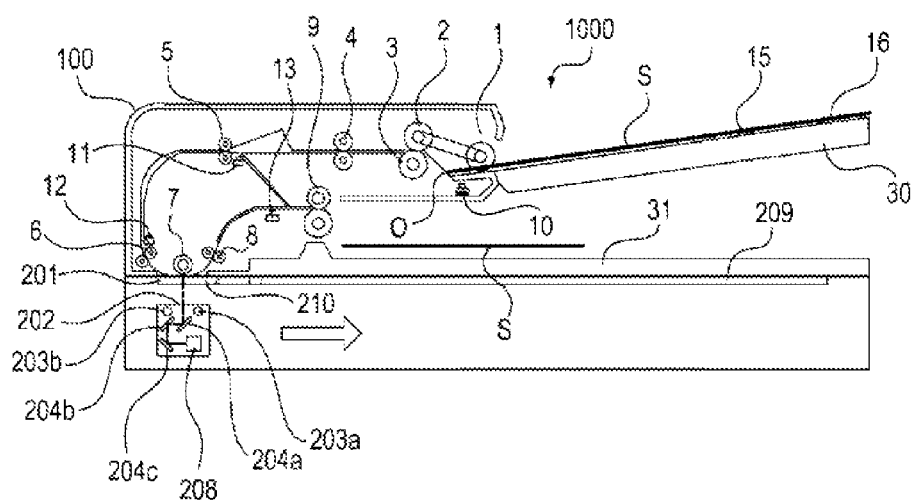
FIG. 13 is a sectional view of the A4-sized original discharged to a discharge tray.

The CPU(A) 801 cancels the reading and discharges the original to the discharge tray 31 with the original conveyed (refer to FIG. 13). Accordingly, there is no need for processing in which the user removes the original (paper jam processing). Thus, usability can be improved.

After that, the CPU(A) 801 determines whether registration-sensor-off-timeout has been made (S418). Accordingly, it is determined whether a paper jam occurs when the original with which the reading has been cancelled is conveyed. For example, time of the registration-sensor-off-timeout can be a time during which the conveyance is performed over a distance of the sub-scanning length of an LDR-sized original (431.8 [mm]) plus a conveying margin (for example, 80 [mm]).

The reason why the sub-scanning length of the LDR-sized original (431.8 [mm]) is selected is because the sub-scanning length is maximum in regular-sized sheets. In the present configuration, the registration sensor 11 is a sensor on the uppermost upstream side on a conveying path. The original length has not been determined.

Next, in a case where the registration-sensor-off detection has not been timed out (No at S418), and the registration sensor 11 has been turned off (Yes at S419), the CPU(A) 801 performs a paper jam detection of the leading sensor 12 (S420).

The length of the original can be distinguished when the registration sensor 11 has been turned off. For example, a timeout period of the leading sensor 12 is determined by adding a margin distance of the paper jam detection to the original length detected when the registration sensor 11 has been turned off.

Next, in a case where leading-sensor-off detection has not been timed out (No at S420), and the leading sensor 12 has been turned off (Yes at S421), the CPU(A) 801 performs paper jam detection of the discharge sensor 13 (S422). The paper jam detection of the discharge sensor 13 may be made similar to the paper jam detection of the leading sensor 12.

Next, in a case where discharge-sensor-off detection has not been timed out (No at S422), and the discharge sensor 13 has been turned off (Yes at S423), the CPU(A) 801 performs stop control of the original (S424). FIG. 13 illustrates an example of a stop position.

In the example of FIG. 13, the original has been conveyed so as to be completely discharged to the original discharge tray 31. The original is conveyed to the position illustrated in FIG. 13. Thus, there is an advantage that the original is easily returned back to the original tray 30.

Figure 14:
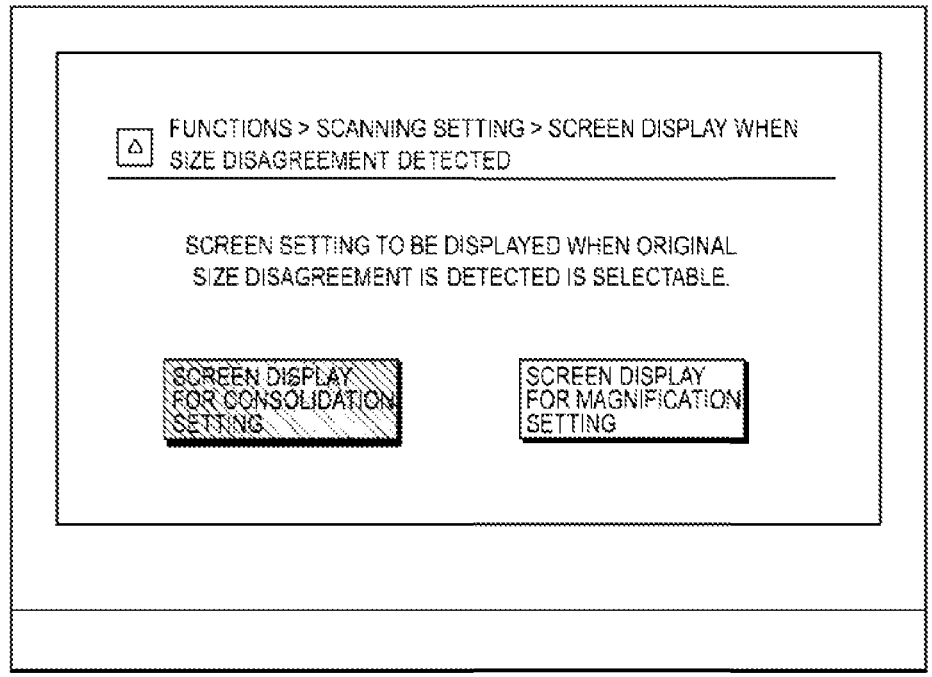
FIG. 14 is an operation-portion screen display for selecting setting for consolidation or magnification in a case of an original reading size disagreement.

After that, the CPU(A) 801 inquires of the CPU(B) 901 whether a consolidation setting screen display for original size disagreement is displayed (S425). The CPU(B) 801 can previously select whether consolidation setting for the original size disagreement is displayed or magnification setting is displayed from the consolidation setting screen for the original size disagreement illustrated in FIG. 14 through the operation display portion 904, before a job is submitted.

Accordingly, a configuration in which the setting is switched each user in response to usage, for example, which of the consolidation setting or the magnification setting is frequently used, can be applied.

When the consolidation setting screen for the original size disagreement is displayed (Yes at S425), the CPU(A) 801 notifies the user that abnormality of the original length has been detected (S426).

Figure 15:
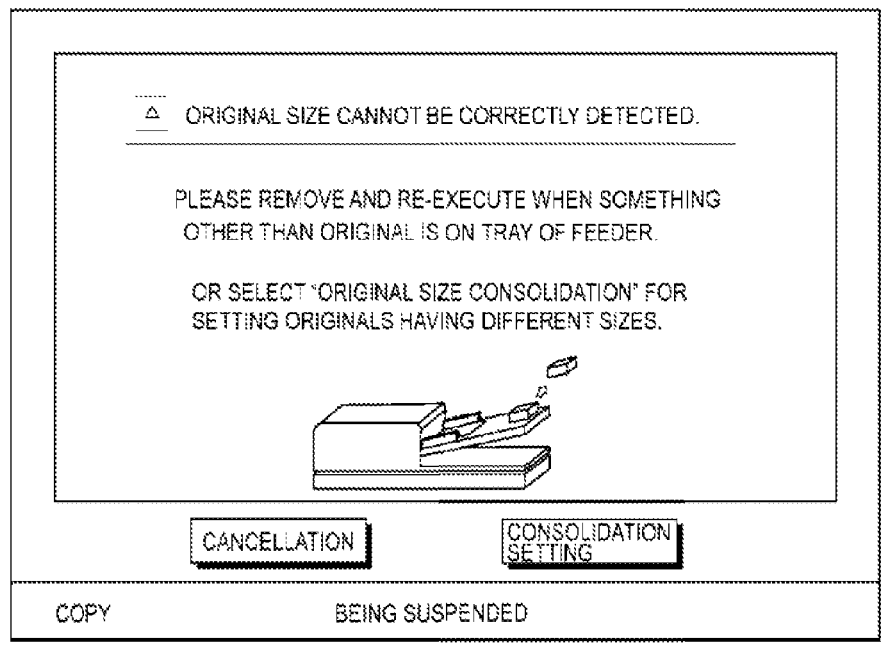
FIG. 15 is an operation-portion screen display when a notification is made that setting for consolidation or removal of an object on the original tray is required.

The notification to the user is performed by notifying the CPU(B) 901 of occurrence of the abnormality through the command communicating portion 301 and displaying the screen illustrated in FIG. 15 to the operation display portion 904.

Figure 16:
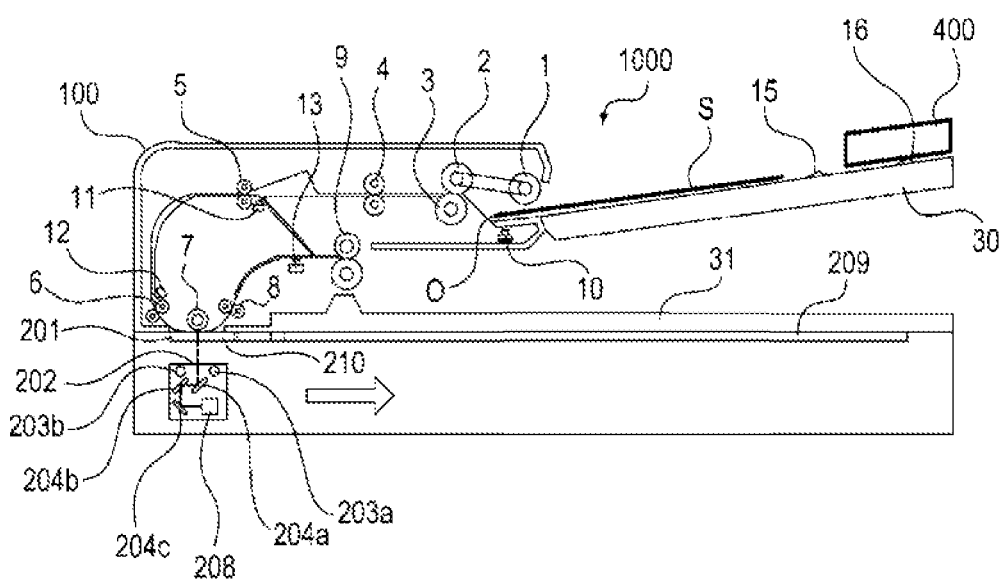
FIG. 16 is a sectional view of an original and an object other than the original disposed on the original tray.

FIG. 15 illustrates a screen for a requirement for removing an object disposed on the original tray 30 or selecting consolidation setting. As illustrated in FIG. 16, an object 400 other than the original is disposed on the original tray 30. Thus, the original-length detecting sensor 16 or the like is turned on and incorrectly detects the original size. Therefore, the screen in FIG. 15 inquires of the user to remove the object 400.

When the consolidation setting screen for the original size disagreement is not displayed (No at S425), the CPU(A) 801 notifies the user that the abnormality of the original length has been detected (S427). FIG. 15 illustrates the screen for selecting cancellation of the reading or setting of the magnification.

The user presses a cancellation button displayed on the operation display portion 904 so that a reading job of the ADF 100 can be cancelled. When a consolidation setting button is pressed, a job to be performed for re-reading can be made to be the consolidation setting.

When a magnification setting button is pressed, a screen for setting magnification can be displayed on the operation display portion 904. The reading magnification setting can be made from the screen.

After the user is notified of the abnormality of the original length at S426 (or at 427), the reading job of the ADF 100 is completed once.

The CPU(A) 801 detects the timeout at each of the steps S418, S420, and S422. In a case where a paper jam is detected, the original conveyance stops at a point in time at which the timeout is detected (S428). Accordingly, when a discharge is made to the discharge tray 31 in a case where it is detected that the overlap region has been the predetermined amount or less, detection of a remaining paper jam that is performed in a case of normal reading can be made. Buckling of an original caused by, for example, the folded original jammed on the conveying passage, can be prevented.

After the step S426, the CPU(A) 801 notifies the user of the abnormality of the reading and that the paper jam has been detected (S429). The notification to the user is achieved by notifying the CPU(B) 901 of the occurrence of the abnormality through the command communicating portion 301 and displaying a screen for a paper jam on the operation display portion 904.

(A Case where Overlap Region Between Original Region and Reading Region is Predetermined Amount or More)

Next, a flow chart will be described below in a case where it is calculated that the overlap region has been the predetermined amount or more, and the size has been correctly determined. The CPU(A) 801 correctly continues the reading and detects the leading sensor 12 turned off (S430) in a case where the overlap region has been the predetermined amount or less at S416. The CPU(A) 801 completes the reading of the image, equivalent to the original length, detected on the original tray 30 (S431).

After that, the CPU(A) 801 continues the original conveyance and detects the discharge sensor 13 turned off (S432). Then, the CPU(A) 801 conveys the original through a distance between the discharge sensor 13 and the discharge roller 9, and discharges the original (S433). Paper jam detection in the detection of the discharge sensor 13 turned off is achieved by a known technique.

The CPU(A) 801 determines whether the following original is present (S434). The original detecting sensor 10 determines whether the following original is present. When the original is present (Yes at S434), going back to the step S403, the following original is conveyed. When the following original is not present (No at S434), the reading job of the ADF 100 is completed.

With the above control, specification of a feeding stage in a case of copying and timing at which a transferring size is determined in a case of transferring a file, can be prevented from delaying, and the reading can start. Accordingly, a reading job can be performed without having a harmful effect on the FCOT and the productivity.

As described above, according to the present embodiment, an overlap region between an original region detected in a case of conveyance and a read specifying region, is calculated. Then, it is determined whether the overlap region is a predetermined amount or less, and it is determined whether reading is cancelled. A possibility can be reduced that an image becomes lost in a case where the reading region that is different from an actual original size on an original tray and is different from the original region, is specified.

Thus, one of the length, area, and ratio relating to the overlap region acquired at S414 is used as an indicator for the overlap region. It is determined whether the reading is cancelled, depending on whether the overlap region has been the predetermined amount or less. Accordingly, there can be provided an easy-to-use original reading apparatus capable of promptly notifying the user of an image deficiency and performing re-reading without annoyance even in a case where an original size is not correctly detected on an original tray and reading specification is not correctly made.

While the present invention has been described with reference to exemplary embodiments, it is to be understood that the invention is not limited to the disclosed exemplary embodiments. The scope of the following claims is to be accorded the broadest interpretation so as to encompass all such modifications, equivalent structures and functions.

This application claims the benefit of Japanese Patent Application No. 2015-154097, filed Aug. 4, 2015, which is hereby incorporated by reference herein in its entirety.

What is claimed is:

1. An image reading apparatus comprising:
   a reading sensor configured to read an image of an original;
   an original tray configured for placement of the original thereon;
   a conveying portion configured to convey the original placed on the original tray to a reading position by the reading sensor;
   a first size detector configured to detect a size of the original placed on the original tray before the conveying portion conveys the original from the original tray;
   a second size detector configured to detect the size of the original being conveyed by the conveying portion;
   an input portion configured to input reading size information by a user, wherein the reading size information relates to a reading size of the original to be read;
   a display configured to display an information; and
   a controller which has a processor configured to perform functions including:
   a first function configured to determine a reading region based on a size of the original detected by the first size detector and a reading size information input by the input portion;
   a second function configured to determine a original region based on a size of the original detected by the second size detector;
   a third function configured to determine an overlap region amount between the reading region determined by the first function and the original region determined by the second function; and
   a fourth function configured to control the display to display predetermined information based on the overlap region amount determined by the third function.

2. The image reading apparatus according to claim 1, wherein the controller determines the overlap region amount based on a reading-start position from a leading end of the original and the size of the original detected by the second size detector.

3. The image reading apparatus according to claim 1, wherein the controller determines the overlap region amount based on a length between a leading end of the original and a reading-start position, and a length of the original in a conveying direction, detected by the second size detector.

4. The image reading apparatus according to claim 1, wherein the controller determines the overlap region amount based on a length between a leading end of the original and a reading-start position, an area of the reading region, and an area of the original being conveyed.

5. The image reading apparatus according to claim 1, wherein the predetermined information indicates that reading has not been correctly performed.

6. The image reading apparatus according to claim 1, wherein the controller controls the reading sensor not to read an image of the original in a case where the overlap region amount is less than a predetermined value.

7. The image reading apparatus according to claim 6, further comprising
a discharging tray onto which the original is discharged, wherein the controller controls the conveying portion to discharge the original onto the discharging tray in the case where the overlap region amount is less than the predetermined value.

8. An image reading apparatus comprising:
a reading sensor configured to read an image of an original;
an original tray configured for placement of the original thereon;
a conveying portion configured to convey the original placed on the original tray along a conveying path to a reading position by the reading sensor;
a detector configured to detect the original being conveyed by the conveying portion along the conveying path;
a controller which has a processor configured to continue reading process of an image of the original in a case that even a reading region corresponding to an instruction by a user and an original region corresponding to a detection by the detector are different, an overlap region between the reading region and the original region is larger than a predetermined amount,
and configured to stop reading process of the image of the original in a case that the overlap region is equal or smaller than the predetermined amount.

9. The image reading apparatus according to claim 8, wherein the overlap portion is a difference between a reading-start position by setting an original-leading-end of the original as a reference and an original-rear-end position from the reference, and
the reading-start position is an information regarding the reading region and the original-rear-end position is an information regarding the original region.

10. The image reading apparatus according to claim 8, wherein the overlap portion is an area of an overlapping portion between the reading region and the original region.

11. The image reading apparatus according to claim 8, wherein the original region is determined based on a period from a timing of the detector to start detecting the original to a timing of the detector not to detect the original.

* * * * *